S. COLBURN.

Grain and Grass Harvester.

No. 1,696.

Reissued June 7, 1864.

Witnesses
John B. Strong
A. B. Thompson

Inventor
C. Wheeler Jr

N. PETERS, Photo-Lithographer, Washington, D. C.

UNITED STATES PATENT OFFICE.

CYRENUS WHEELER, JR., OF POPLAR RIDGE, NEW YORK, ASSIGNEE OF SYLVESTER COLBURN, OF ANSONIA, CONNECTICUT.

IMPROVEMENT IN GRAIN AND GRASS HARVESTERS.

Specification forming part of Letters Patent No. 13,160, dated July 3, 1855; Reissue No. 1,696, dated June 7, 1864.

DIVISION B.

*To all whom it may concern:*

Be it known that SYLVESTER COLBURN, of Ansonia, in the county of New Haven and State of Connecticut, has invented certain new and useful Improvements in Grain and Grass Harvesters; and I do hereby declare that the following is a full and exact description of the construction and operation thereof, reference being had to the accompanying drawings and the letters of reference marked thereon, in which—

Figure 1:
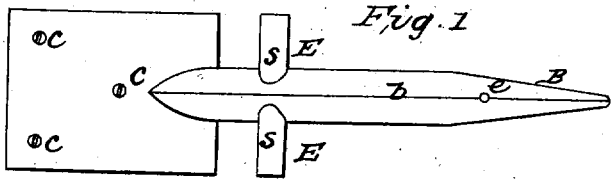
Figure 2:
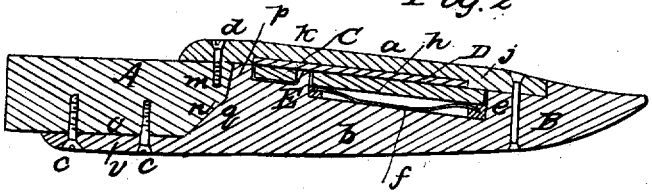
Figure 3:
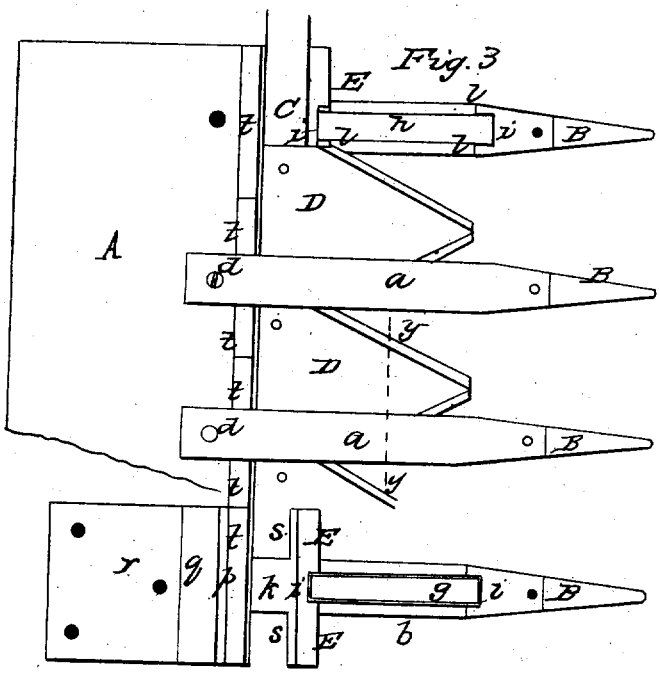
Figure 4:
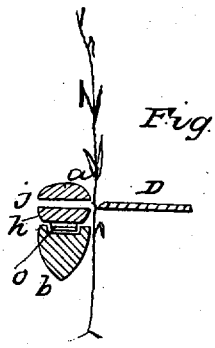

Figure 1 is a plan view of the under side of one of the guard-fingers. Fig. 2 is a transverse section of the finger-bar and cutter-bar, and a longitudinal section of the guard-finger, ledger-plate, and one of the cutter-sections, *x x*, Fig. 3, showing the plane of section. Fig. 3 is a plan or top view of the finger-bar, guard-fingers, cutter-bar, and sections, the upper part of one of the fingers being removed to show the position of the ledger-plate. In another the ledger-plate is also removed to show the spring under it, and the finger-bar is also removed to show the shank of the guard-finger. Fig. 4 is a transverse section of one of the guard-fingers, ledger-plate, spring, and cutter, *y y* showing the plane of section.

Similar letters, where they appear in the several figures, indicate corresponding parts.

The invention relates to that class of cutting apparatus for harvesters in which the guard-fingers support the grass or grain above as well as below the plane of the reciprocating cutter in its action in severing the crop; and the nature of the invention consists in forming the fingers with brace-bars; also, in so constructing the shanks of the guard-fingers that they shall also serve to brace the fingers.

Another branch of the invention having been described in a separate application bearing even date herewith, and marked "A," this application will embrace in its description only so much of the invention as is necessary to a clear comprehension of that part thereof claimed herein.

To enable others skilled in the art to make and use the invention, I will proceed to describe the same.

A is the finger-bar, the front edge of which has two planes, *m* and *n*, the under side forming a third, (marked *o*.) The shanks of the guard-fingers B are constructed with corresponding planes, (marked *p*, *q*, and *r*,) which serve as bearing-points for the finger-bar A. The fingers B are fastened to the under side of the finger-bar A by screws or bolts *c*. With the guard-fingers B are formed brace-bars E, which project from the fingers on either side, and their upper surface is parallel to the plane of the cutters D, and form, when the fingers B are in their places on the finger-bar, a continuous line of braces in front of the cutter-bar C, giving lateral support to the guard-fingers, serving, also, as bearings for the cutter, protecting the cutter-bar C from stones, and preventing fibers of the crop from being forced back under the cutter-bar.

To give the brace-bars E the necessary stiffness without making them of objectionable width, as well as to the better protect the cutter-bar C, the brace-bars E are provided with a flange, *s*, at its lower edge, that projects under the front edge of the cutter-bar C. To give additional support to the guard-fingers B, that part of their shank that bears against the front edge of the finger-bar A is made as high as the finger-bar and wide enough to meet between the fingers and form a continuous line of braces, *t*, between the cutter-bar C and finger-bar A.

The cutter D is of the ordinary triangular or scalloped form, constructed in sections, beveled on the upper side and brought to a sharp flush edge on its lower side, and fastened to the top of the cutter-bar C by rivets. The cutter D has a reciprocating motion imparted to it by any of the usual methods, and works directly over the ledger-plates *h*, the cutting being effected by the joint action of the sharp angular corners of the ledger-plates *h* and the sharp flush edges of the cutter D, operating on the principle of shears, the grain or grass being at the same time prevented from bending over by the part *a* of the finger B, which is above the plane of the cutter D. (See Fig. 4.)

Having fully described the invention, what I claim as new, and desire to secure by Letters Patent, is as follows:

1. Forming with the guard-finger, below the cutter and in front of the cutter-bar, projecting brace-bars, serving as lateral bearings for the cutter and as braces between the fingers, substantially as set forth.

2. Forming the brace-bars with a flange or rib projecting back from it under the front edge of the cutter-bar, to give additional stiffness and to protect the cutter-bar, substantially as set forth.

3. In combination with the braces in front of the cutter-bar, making that part of the guard-finger between the cutter-bar and finger-bar wide enough to serve as braces between the fingers, substantially as set forth.

C. WHEELER, JR.

Witnesses:
JOHN B. STRONG,
A. B. THOMPSON.